US010163282B2

(12) United States Patent
Nikitin et al.

(10) Patent No.: US 10,163,282 B2
(45) Date of Patent: Dec. 25, 2018

(54) SYSTEMS AND METHODS FOR AUTHENTICATION

(71) Applicant: INTERMEC, INC., Lynnwood, WA (US)

(72) Inventors: Pavel Nikitin, Seattle, WA (US); Stephen J. Kelly, Marion, IA (US)

(73) Assignee: INTERMEC, INC., Lynnwood, WA (US)

( * ) Notice: Subject to any disclaimer, the term of this patent is extended or adjusted under 35 U.S.C. 154(b) by 0 days.

(21) Appl. No.: 15/085,167

(22) Filed: Mar. 30, 2016

(65) Prior Publication Data

US 2017/0287240 A1 Oct. 5, 2017

(51) Int. Cl.

| | |
|---|---|
| ***G06F 21/31*** | (2013.01) |
| ***G06F 21/32*** | (2013.01) |
| ***G06K 7/10*** | (2006.01) |
| ***G06Q 20/32*** | (2012.01) |
| ***H01Q 7/00*** | (2006.01) |
| ***H05K 3/46*** | (2006.01) |
| ***G06K 5/00*** | (2006.01) |
| ***G07C 9/00*** | (2006.01) |

(52) U.S. Cl.
CPC ................................ *G07C 9/00007* (2013.01)

(58) Field of Classification Search
CPC .......... G06F 21/31; G06F 21/63; G06F 21/32; G06F 21/00; G06K 7/10; G06Q 20/32; G09G 5/00; A61K 1/137; G08B 21/02
USPC ........ 340/5.65; 342/70, 27, 28, 89; 235/382, 235/380, 385
See application file for complete search history.

(56) References Cited

U.S. PATENT DOCUMENTS

| | | | | |
|---|---|---|---|---|
| 5,615,277 A * | 3/1997 | Hoffman | G06F 21/32 | 382/115 |
| 5,623,552 A * | 4/1997 | Lane | G06K 13/073 | 235/492 |
| 5,862,247 A * | 1/1999 | Fisun | G06K 7/12 | 283/89 |
| 6,038,666 A * | 3/2000 | Hsu | G07C 9/00087 | 380/285 |
| 6,307,956 B1 * | 10/2001 | Black | G06F 3/03545 | 382/124 |
| 6,431,643 B2 * | 8/2002 | Grey | B60N 2/002 | 105/354 |

(Continued)

OTHER PUBLICATIONS

"Biometrics and Wearables: Enabling the Next Billion Dollar Disruptions;" Inside Activity Tracking; by CVC on Sep. 12, 2013; http://www.insideactivitytracking.com/wearables-enable-biometrics-that-will-disrupt-billion-dollar-security-market/.

(Continued)

*Primary Examiner* — Nam V Nguyen
(74) *Attorney, Agent, or Firm* — Oliff PLC; R. Brian Drozd

(57) ABSTRACT

Systems and methods for authentication are provided. One system includes a device configured to sense electrical characteristics of an item coupled with a person and a memory storing a plurality of electrical signatures corresponding to measured electrical characteristics for a plurality of items. The system also includes a controller operable on a processor to determine if an electrical signature determined from sensed electrical characteristics of the item coupled with the person match one of the plurality of electrical signatures stored in the memory to authenticate the person having the item coupled thereto.

24 Claims, 4 Drawing Sheets

(56) References Cited

U.S. PATENT DOCUMENTS

| | | | | |
|---|---|---|---|---|
| 6,539,101 | B1 * | 3/2003 | Black | G06F 3/03545 382/124 |
| 6,695,207 | B1 * | 2/2004 | Norris, Jr. | B60R 25/23 235/380 |
| 6,703,918 | B1 * | 3/2004 | Kita | G06F 21/32 340/5.52 |
| 6,774,796 | B2 * | 8/2004 | Smith | G06F 21/35 340/573.1 |
| 6,825,752 | B2 * | 11/2004 | Nahata | E05B 81/78 180/273 |
| 7,230,519 | B2 * | 6/2007 | Coughlin | G06F 21/35 340/5.52 |
| 7,283,034 | B2 * | 10/2007 | Nakamura | B60R 25/246 340/5.2 |
| 8,077,075 | B2 * | 12/2011 | Randier | G01S 13/345 342/104 |
| 8,280,120 | B2 * | 10/2012 | Hoyos | G06K 9/00107 340/5.53 |
| 8,405,515 | B2 * | 3/2013 | Ishihara | B60R 25/246 340/10.1 |
| 8,833,657 | B2 | 9/2014 | Johnson | |
| 9,092,954 | B2 * | 7/2015 | Visitacion | G08B 6/00 |
| 9,223,451 | B1 * | 12/2015 | Raffle | G06F 3/044 |
| 9,354,751 | B2 * | 5/2016 | Fisher | G06F 3/0416 |
| 9,521,245 | B2 * | 12/2016 | Yang | G04G 21/04 |
| 9,600,076 | B2 * | 3/2017 | Levesque | G06F 3/016 |
| 9,658,693 | B2 * | 5/2017 | Levesque | G06F 3/011 |
| 9,679,128 | B1 * | 6/2017 | Leung | G06F 21/44 |
| 9,693,711 | B2 * | 7/2017 | Yuen | A61B 5/117 |
| 9,984,548 | B2 * | 5/2018 | Kechichian | G08B 21/02 |
| 2003/0046228 | A1 | 3/2003 | Berney | |
| 2012/0075173 | A1 * | 3/2012 | Ashbrook | G06F 3/014 345/156 |
| 2012/0280900 | A1 | 11/2012 | Wang et al. | |
| 2012/0317024 | A1 * | 12/2012 | Rahman | G01K 13/002 705/42 |
| 2013/0183646 | A1 | 7/2013 | Lusted et al. | |
| 2014/0085050 | A1 * | 3/2014 | Luna | G07C 9/00087 340/5.82 |
| 2014/0089675 | A1 * | 3/2014 | Kato | H04L 9/0869 713/189 |
| 2014/0279528 | A1 * | 9/2014 | Slaby | H04L 63/0853 705/44 |
| 2014/0366123 | A1 * | 12/2014 | DiBona | G06Q 10/00 726/16 |
| 2015/0035643 | A1 * | 2/2015 | Kursun | G07C 9/00134 340/5.52 |
| 2015/0135310 | A1 * | 5/2015 | Lee | A61B 5/681 726/20 |
| 2015/0164430 | A1 * | 6/2015 | Hu | A61B 5/7264 600/595 |
| 2015/0178532 | A1 * | 6/2015 | Brule | G06K 19/0717 340/5.61 |
| 2015/0312704 | A1 * | 10/2015 | Tarnhed | H04W 4/008 455/41.1 |
| 2015/0363585 | A1 * | 12/2015 | Gooding | G06F 21/32 726/19 |
| 2015/0381609 | A1 * | 12/2015 | Dadu | H04L 63/0861 726/9 |
| 2016/0154952 | A1 * | 6/2016 | Venkatraman | H04L 63/0861 705/44 |
| 2016/0171192 | A1 * | 6/2016 | Holz | G06F 21/31 726/19 |
| 2016/0378235 | A1 * | 12/2016 | Dow | G06F 3/0227 345/174 |
| 2017/0010670 | A1 * | 1/2017 | Tanaka | G06F 1/163 |

OTHER PUBLICATIONS

Sage; "Fund This: Ting, the touchless gesture controller to everything," iMore, Mar. 1, 2014; http://www.imore.com/fund-ring-touchless-gesture-controller-everything.

* cited by examiner

SYSTEMS AND METHODS FOR AUTHENTICATION

BACKGROUND

Identification and tracking devices are widely used in many different applications. For example, devices that are associated with particular individuals may be used to authenticate that individual to allow access to buildings, electronic services, etc. The available devices for building and airport access control and e-services authentication, among others, are varied. These devices may be wearable and include microchips or other electronics that allow for the identification of the user associated with the device.

However, the known devices for identification and/or tracking are complex and require either wearing a special electronic device (e.g., a passive or active device, such as a specialized badge, wristband, rings, etc.) or involves very complicated biometric scanning procedures (e.g., retina or fingerprint scanning and analysis). Thus, specialized hardware or components need to be added for the operation of conventional devices for identification and/or tracking. This specialized hardware or components can add to the overcall size of the device and/or cost of the device.

SUMMARY

To overcome these and other challenges, aspects of broad inventive principles are disclosed herein.

In one embodiment, a system is provided that includes a device configured to sense electrical characteristics of an item coupled with a person and a memory storing a plurality of electrical signatures corresponding to measured electrical characteristics for a plurality of items. The system also includes a controller operable on a processor to determine if an electrical signature determined from sensed electrical characteristics of the item coupled with the person match one of the plurality of electrical signatures stored in the memory to authenticate the person having the item coupled thereto.

In another embodiment, a system is provided that includes a sensor pad having a device including an antenna embedded in a metal plate, wherein the device is configured to sense the electrical characteristics of an item positioned in proximity to the sensor pad. The system also includes a dielectric cover on top of the antenna to define a sensing distance from the antenna to the item and a controller operable on a processor to authenticate a person wearing the item using the sensed electrical characteristics of the item based on a determined self-inductance between the item and the antenna.

In another embodiment, a method for identifying an item to authenticate a person is provided. The method includes configuring a device to sense one or more electrical characteristics of an item coupled with a person and determining, with a processor, an electrical signature of the item coupled with the user. The method also includes comparing, with the processor, the determined electrical signature with a plurality of stored electrical signatures stored in a memory to determine a match. The method further includes allowing access, with the processor, to a restricted physical or electronic area if a match is determined and denying access to the restricted physical or electronic area if no match is determined.

DETAILED DESCRIPTION

Figure 1:
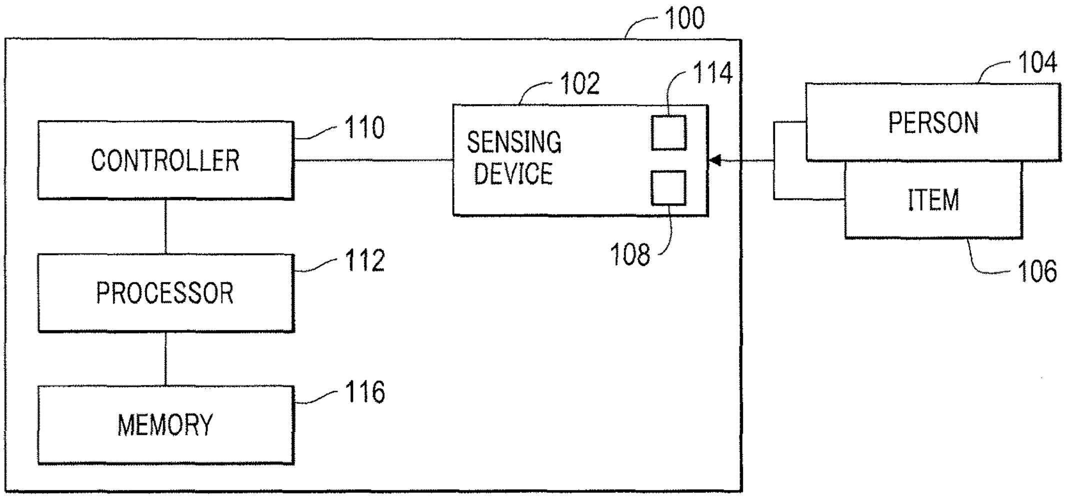
FIG. 1 is a block diagram illustrating a system according to one embodiment.

The exemplary embodiments described herein provide detail for illustrative purposes and are subject to many variations in structure and design. It should be appreciated, however, that the embodiments are not limited to a particularly disclosed embodiment shown or described. It is understood that various omissions and substitutions of equivalents are contemplated as circumstances may suggest or render expedient, but these are intended to cover the application or implementation without departing from the spirit or scope of the claims.

Also, it is to be understood that the phraseology and terminology used herein is for the purpose of description and should not be regarded as limiting. The terms "a," "an," and "the" herein do not denote a limitation of quantity, but rather denote the presence of at least one of the referenced object. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, as will be appreciated by one skilled in the art, aspects of the present disclosure may be embodied as a system, method, or computer program product. Accordingly, aspects of various embodiments may take the form of an entirely hardware embodiment, an entirely software embodiment (including firmware, resident software, micro-code, etc.) or an embodiment combining software and hardware aspects that may all generally be referred to herein as a "circuit," "module", "system" or "sub-system." In addition, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM) or similar DVD-ROM and BD-ROM, an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

At least some of the present disclosure is described below with reference to flowchart illustrations and/or block diagrams of methods, apparatus (systems) and computer program products according to embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks and when implemented in one or more embodiments, results in a transforming or converting a general purpose computer/processor/hardware to a specialized computer/processor/hardware that improves the technological art.

Various embodiments may include a user wearable item that is used as a unique identifier. It should be appreciated that although one or more embodiments may be described in connection with a particular wearable item, such as a piece of jewelry, the embodiments are not limited to the particular wearable item and may be implemented in connection with any item or object that a user may carry or wear. Thus, the particular wearable item may be wearable on a portion of the user, carried by the user, or otherwise coupled with the user to act as a unique identifier.

For example, individuals often wear particular jewelry, especially jewelry that has significance or evokes good memories, and which the individuals wear regularly. For example, the jewelry may be one or more metal rings worn on a user's finger, watches, bracelets, etc. By practicing one or more embodiments, the jewelry or other items worn or carried by a user act as a unique identifier without the need for additional electronics to be used in the identification process. Thus, electronics (including active and passive electronics) do not have to be added to the jewelry or object nor do additional pieces have to be worn or carried in order to provide the unique identification. Thus, in one or more embodiments, an individual's jewelry (also referred to as normal or non-modified jewelry) may be used as a unique identifier without modifying the jewelry or adding electronic components to the jewelry. Additionally, one or more embodiments may be implemented in connection with other normal or non-modified items worn or carried by a user.

One embodiment of a sensing system 100, which may be configured as an authentication, identification or tracking system includes a sensing device 102 configured to sense an item 104 associated with a person 106. For example, the sensing device 102 may be configured to sense an item 104 coupled with, such as worn by, or carried by the person 106. The sensing system 100 is operable in some embodiments to identify the item 106 and associate the item 106 with the person 104 using characteristics of the item 106 and/or the person 104. In one embodiment, the item 106 is a ring worn by the person 104, with the ring used as a unique identifier. For example, a finger ring (e.g., wedding ring, graduation rings, etc.) may act or operate as a unique identifier, such as to allow physical or electronic access to the wearer, including, but not limited to, a secure or restricted physical location or electronic location after identification by the sensing system 100. As described in more detail herein, various embodiments use the unique characteristics of the item 106, such as jewelry to identify the particular item 106 when worn or carried by an individual based on one or more characteristics of the item 106.

In one embodiment, in which the item 106 is a ring, the characteristics of the ring include, but are not limited to, the diameter, cross-sectional shape, metal (or material), ornamentation, etc. of the ring that define unique characteristics, which may also be affected by the unique characteristics of the wearer of the ring (e.g., unique electrical biometric characteristics of the person 104) and compensated for by various embodiments. Thus, the sensing system 100 may use one or more characteristics of the item 106, alone or in combination with one or more characteristics of the person 104 wearing the item 106, which may affect the characteristics of the item 106, to identify the item 106. The identification process may then be used, for example, to validate or authenticate a user's access to a physically or electronically secure area. It should be appreciated that various embodiments of the sensing system 100 may be used in different applications and in different fields. For example, the sensing system 100 may be used to sense different types of items 106 that may be worn or carried by the person 104. Additionally, in some embodiments, the sensing system 100 may be used to sense an item 106 worn by an animal (e.g., a dog tag) or coupled with a moving vehicle (e.g., a transport cart). Thus, the sensing system 100 may be used in many different residential, commercial or industrial applications.

It should be appreciated that the sensing system 100 may be configured to allow for many different types of items 106 to be sensed or detected without the need for specialized hardware or components to be included as part of the object to be detected, which in various embodiments is the item 106 worn or carried by the person 104. Moreover, different coupling arrangements may be employed by the person 104 to couple the item 106 to themselves. For example, the item 106 may be worn on, attached to, support by or otherwise connected directly with the person 104 or part of the person 104 or to something the person 104 is wearing.

Figure 2:
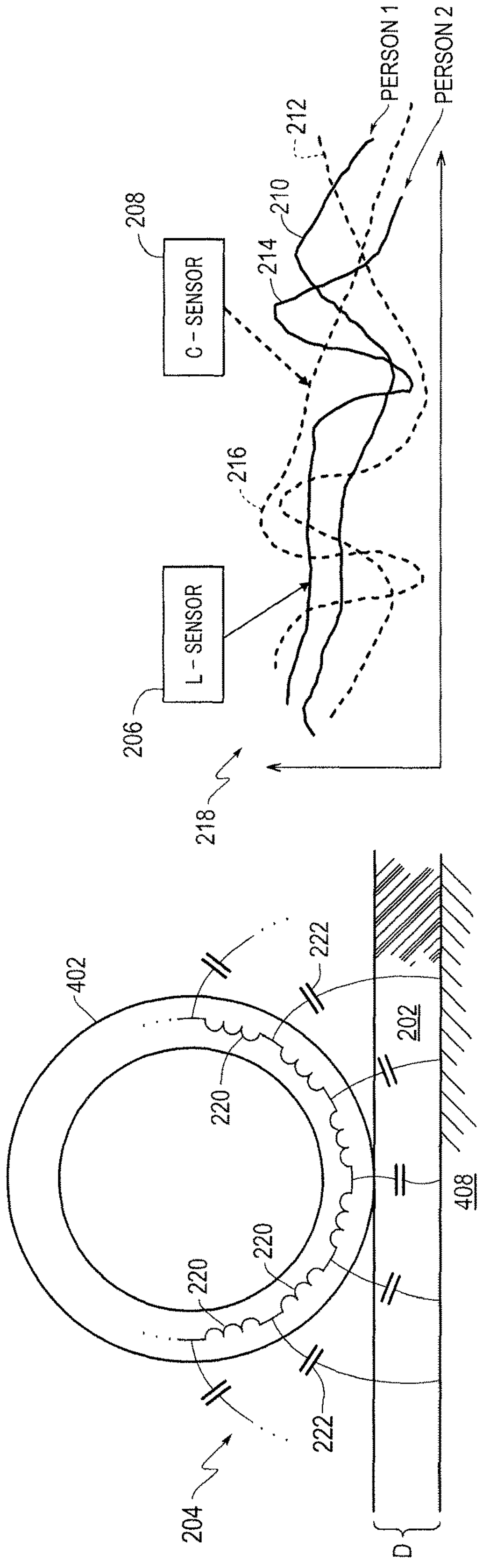
FIG. 2 is a diagram illustrating a sensor configuration according to one embodiment.

The sensing system 100 in various embodiments includes one more or more antennas 108 and sensors 114 (which may be configured as hardware and/or software analytics), which may form part of the sensing device 102 or be embodied as the sensing device 102. For example, in one embodiment, the sensing device 102 includes a spiral antenna as the antenna 108, which is used to detect the characteristics or properties of the item 106, which may include electrical characteristics or properties. For example, in some embodiments the sensing device 102, including the antenna 108, is configured to sense or measure the parasitic inductance(s) and/or capacitance(s) of the item 106 when placed in proximity to the antenna 108. In various embodiments, a cover 202 (e.g., a dielectric cover as shown in FIG. 2) is positioned over the antenna 108 to prevent the item 106 from directly contacting the antenna 108, but allowing the item 106 to be brought within a sensing distance (D) from the antenna 108. Thus, a thickness of the cover 202 is defined based on a desired sensing distance for the item 106 to be sensed.

The sensing system 100 can also include a controller 110 coupled to the sensing device 102. It should be noted that any type of communicative or operative coupling may be used between the various components forming the sensing system 100, such as any type of wireless or wired communication. The controller 110 is configured to control the sensing of the properties and/or characteristics of the item 106, such as to control the reception by the antenna 108 used to determine parasitic inductance(s) and/or capacitance(s) as described in more detail herein.

The sensing system 100 can further include a processor 112 coupled to the controller 110. As described in more detail herein, the processor 112 can control the operation of the controller 110 to receive and process information from the antenna 108. For example, the processor 112 in various embodiments is configured to receive sensed or measured information relating to the item 106 that is in proximity to the antenna 108. In some embodiments, the processor 112 is configured to determine parasitic inductance(s) and/or capacitance(s) between the antenna 108 and the item 106 using a distributed element model. The parasitic inductance(s) and/or capacitance(s) may be used to identify the item 106, which identification may then be used for authentication of the person 104 or for other processes as desired or needed.

The processor 112 is also configured in various embodiments to process received parasitic inductance(s) and/or capacitance(s) information acquired by the sensing device 102 to allow the sensing system 100 to determine the specific item 106 that was or is sensed by the sensing device 102. The processor 112 may use a combination of sensed information (e.g., parasitic inductance(s) and/or capacitance(s)), timing information (e.g., amount of time that the item 106 is sensed by the sensing device 102) and position information (e.g., the orientation of the item 106 may affect the sensed information) to authenticate the person 104. For example, the processor 112 in some embodiments is configured to determine whether the sensed characteristics or properties of the item 106 match a predetermined signature or profile of the item 106 (e.g., a predetermined electrical or radar reflection signature or profile) to allow access to a secure physical or electronic location. As part of the sensing process, the processor 112 may be configured to confirm that the item 106 is within the sensing distance (D) for a predetermined time period or within a predetermined time range (e.g., 3-5 seconds).

Figure 4:
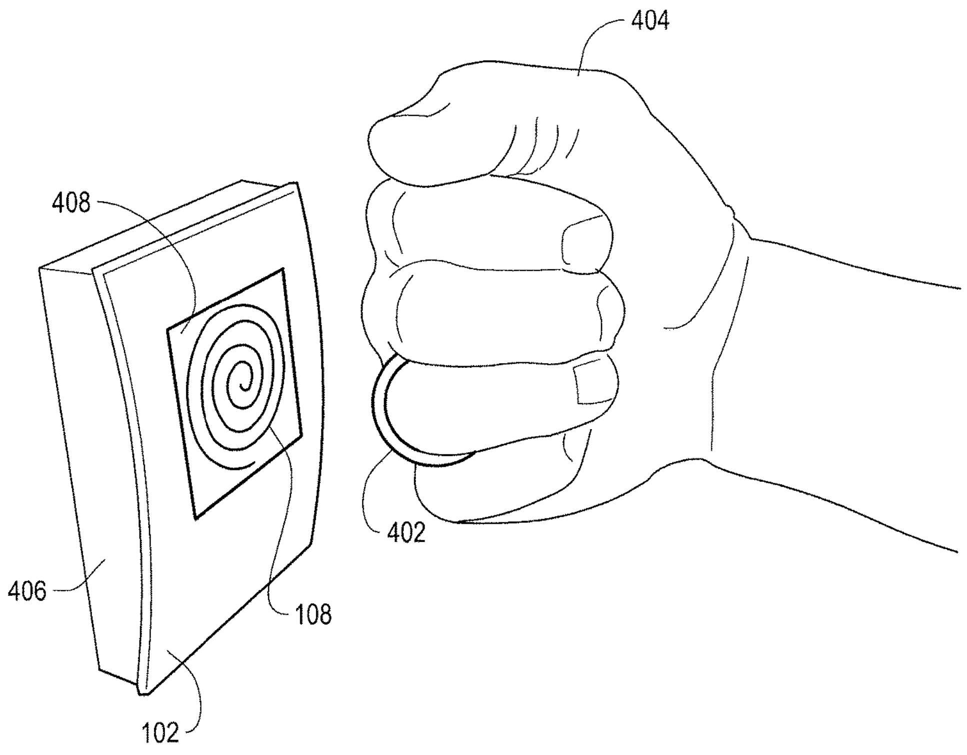
FIG. 4 is a diagram illustrating a sensor for sensing the characteristics of a ring according to an embodiment.

For example, as shown in FIG. 4, the sensing device 102 of the sensing system 100 may be used to acquire identifying information (e.g., parasitic inductance(s) and/or capacitance(s)) to uniquely identify a ring 402 (e.g., a wedding ring) on a hand 404 of a person. As can be seen, the sensing device 104 may be within a housing 406 that defines a sensing pad mounted to a wall. In the illustrated embodiment, the ring 402 may be used as a biometric pass with the sensing device 104 configured for detection and authentication. It should be noted that the antenna 108 in this embodiment is illustrated as a spiral near field transmission line antenna, which operates as a ring detector device. However, as should be appreciated, other antenna structures may be used. Additionally, the cover 202 (shown in FIG. 2) prevents the ring 402 from contacting the antenna 108.

In the illustrated embodiment, the self-resonant frequency of the 22 mm diameter ring 402 is about 4.4 GHz. The ring 402 can be characterized ("fingerprinted") using different detection or sensing methods described herein. For example, the sensing system 100 may use a low frequency detection method or a high frequency detection method to identify the ring 402.

More particularly, and with reference also to FIG. 1, the processor 112 may be configured to use a low frequency detection method to identify the ring 402 (or other item 106). For example, in this embodiment, the sensing device 102 is used to measure ring parasitics (e.g., parasitic inductance(s) and/or capacitance(s)) at low frequencies to identify the ring 402. In some embodiments, the low frequencies used are approximately below the ring self-resonance. However, different frequencies may be used as desired or needed, for example, based on the item 106 to be detected. In operation, when a person touches a metal pad 408 (covered in various embodiments with the cover 202 shown in FIG. 2 as a dielectric cover), the proximity of the ring 402 to the antenna 108 forms a distributed parasitic chain 204 (inductances 220 and capacitances 222) as shown in FIG. 2 that can be measured by an inductance sensor 206 (L-sensor) or a capacitance sensor 208 (C-sensor), which in various embodiments are programmable analytics. It should be noted that different methods of measuring self-inductance may be used and the various embodiments are not limited to a particular measuring process.

The process for performing the low frequency detection method to identify the ring 402 (or other item 106) includes analyzing the self-inductance to identify the ring 402 by the unique self-inductance signature 218 of the ring 402. Moreover, as shown in FIG. 2, the self-inductance signature 218

(where the horizontal axis of the graph is frequency and the vertical axis is value) of different individuals wearing different rings corresponds to different inductance and capacitance signature curves 210, 212 and 214, 216 that may be used to identify the particular ring 402. It should be noted that various embodiments may be used to identify and "fingerprint" multiple rings on a hand, bracelets, etc.

Figure 3:
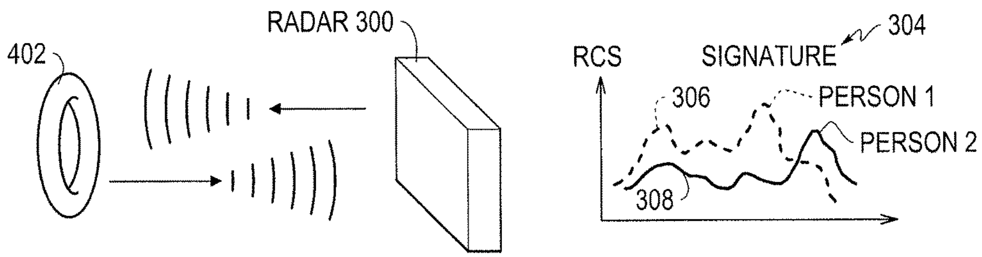
FIG. 3 is a diagram illustrating a sensor configuration according to another embodiment.

In some embodiments, the processor 112 may be configured to use a high frequency detection method to identify the ring 402 (or other item 106). For example, in various embodiments, the high frequency method includes using a compact radar 300 as shown in FIG. 3 to measure the radar signature of the ring 402 using frequencies above the ring self-resonance as the person 104 holds their finger with the ring 402 in front of the radar 300. The process for performing the high frequency detection method to identify the ring 402 (or other item 106) includes analyzing the received radar reflection from the ring 402 to identify the ring 402 by the unique complex radar cross section (RCS) signature 304 of the ting 402. Moreover, as shown in FIG. 3, the complex radar cross section (RCS) signature 304 of different individuals wearing different rings corresponds to different signature curves 306 and 308 (where the horizontal axis of the graph is frequency and the vertical axis is value) that may be used to identify the particular ring 402. It should be noted that various embodiments may be used to identify and "fingerprint" multiple rings on a hand, bracelets, etc. Additionally, the ring 402 may be detected without the person having to lift his or hand to place the ring in proximity to the radar 300.

In various embodiments, the unique signatures of one or more items 106, for example, the unique self-inductance signature 218 and/or unique complex radar cross section (RCS) signature 304 of one or more rings 402 are first measured and then subsequently used to identify the ring 402. For example, a stored unique self-inductance signature 218 and/or unique complex radar cross section (RCS) signature 304 may be compared to a measured or sensed self-inductance signature 218 and/or complex radar cross section (RCS) signature 304 detected by the sensing device 102 to determine if there is a match. The matching process may include different types of curve matching or curve fitting methods to determine a matching signatures or profiles.

In various embodiments, the sensing system 100 includes a memory 116, which may be any type of electronic storage device that can be coupled to the processor 112 (or form part of the processor 112). The processor 112 may access the memory 112 to obtain stored information, such as stored unique self-inductance signature 218 and/or unique complex radar cross section (RCS) signature 304 information to identify the ring 402 or item 106 as described herein. For example, the memory 116 may store the unique self-inductance signature 218 and/or unique complex radar cross section (RCS) signature 304 information for different items 106 that have been previously measured. In some embodiments, an initial signature determination process may be performed to determine the unique self-inductance signature 218 and/or unique complex radar cross section (RCS) signature 304 of the item 106, which is then stored in the memory 116. It should be noted that when initially storing the different measured signatures, the process may include holding the item 106 in different positions and/or orientations with respect to the sensing device 102 and/or moving the item 106 while the sensing is being performed. For example, when using the radar 300, by waving the item 106, a three-dimensional (3D) signature may be obtained that includes 3D cross-section information, frequency information and time information corresponding to the Z axis, X-axis and Y-axis, respectively. Additionally, different patterns of positions of the item 106 with respect to the sensing device 102 may be used to authenticate the person 104.

While the figures illustrate particular connection arrangements of the various components, a skilled artisan would appreciate the fact that other connection arrangements may be made that are within the scope of this disclosure. Additionally, the various components may be housed within the same or different physical units and the separation of components within the figures is merely for illustration.

It should be appreciated that in some embodiments, the controller 110 may automatically initiate the sensing process described herein. However, in other embodiments, the person 104 may initiate the sensing process by pressing a button or activating a member that starts the sensing process.

Thus, various embodiments allow for identifying the item 106 using the characteristics or properties of the item (e.g., a ring, necklace, belt buckle or earring). The sensing system 100 uses the unique electrical profile of the item 106 in various embodiments to identify the item 106. As should be appreciated, the unique electrical profile of the same item 106 may be different when the item is coupled to or worn by different individuals. Moreover, the sensing system 100 may be configured to identify a combination of items 106 or only a sub-set of items 106 coupled to or worn by the person 104. In various embodiments, an authentication is performed based on a stored electrical profile or pattern, such as the self-inductance of a ring as described herein. Various embodiments may also provide items 106 such as wearable wings having unique shapes or physical characteristics that are assigned to different individuals.

Some embodiments of the sensing system 100 may be embodied as an authentication or secure access device used to restrict access to a secure physical or electronic area. For example, the sensing system 100 may be part of a security pad that is used to restrict access to a building or a portion of a building. As another example, the sensing system 100 may be part of a security pad that is used to restrict access to a computer or server. As should be appreciated, one or more embodiments may be implemented using different circuit designs and configured for operation within different settings and with different types of items 106.

Figure 5:
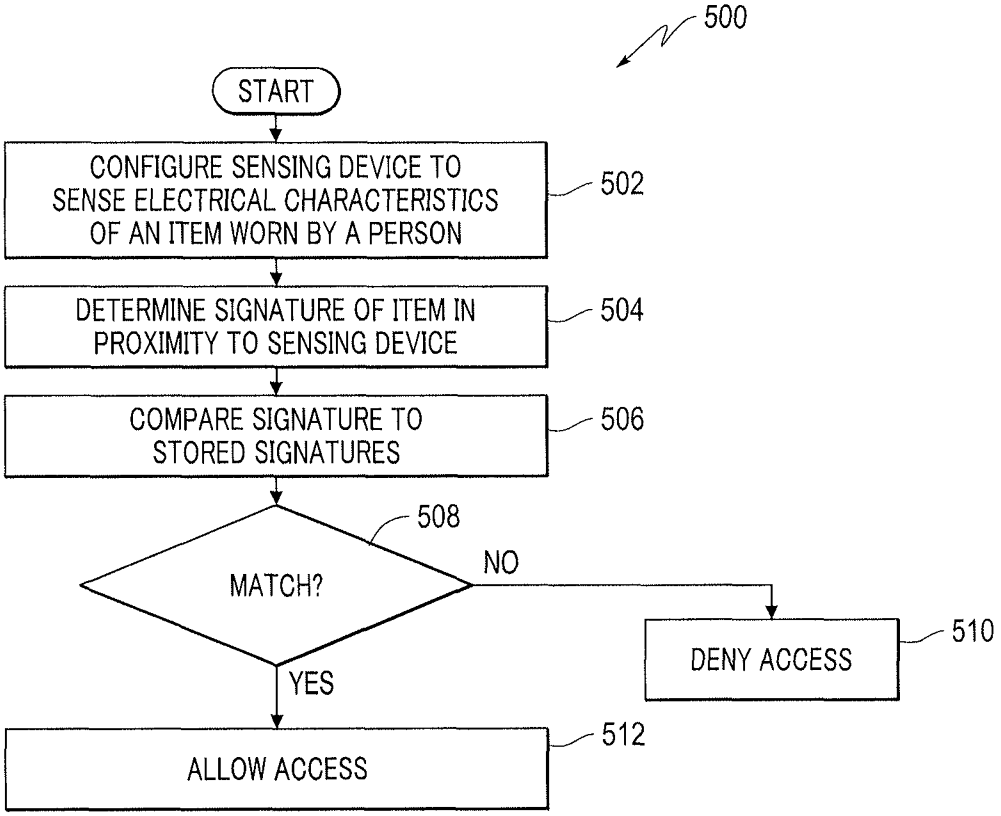
FIG. 5 is a flowchart of a method according to an embodiment.

One or more embodiments include a method 500 as illustrated in FIG. 5. With reference also to FIGS. 1-4, the method 500 may be implemented or performed using one or more systems described herein, such as the sensing system 100. It should be noted that the steps of the method 500 may be performed in a different order and some steps may be performed concurrently. Additionally, some steps may be repeated. The steps also may be performed by the processor 112 such that the processor 112 is a specialized processing machine/specialized hardware.

The method 500 includes configuring a sensing device to sense electrical characteristics of an item worn by a person at 502. For example, as described herein, the sensing device 102 may be configured to sense or detect electrical characteristics of the item 106. In some embodiments, the sensing device 102 is configured to detect the inherent electrical characteristics of the item such that no modifications or additions to the item are needed in order for the sensing device 102 to sense the item. Thus, in various embodiments, no passive device, active device, smart device or other electronic device is couple with or incorporated with the item 106.

The method 500 further includes determining a signature of an item in proximity to the sensing device at 504. For example, using the sensing device 102, inductance and capacitance profiles or complex radar cross section (RCS) signatures unique to the item(s) are determined as described herein. The profiles may be defined by unique curves or response patterns for a particular item.

The method 500 also includes comparing the determined signature to stored signatures at 506. For example, the signature of the item determined from the measured characteristics is compared to signatures stored in the memory 116. The stored signatures may be obtained during a set-up or initialization process for each item 106 in order to register the item 106 with the system. The set-up or initialization process may include one or multiple measurements with respect to the item 106.

The method additionally includes determining if there is a match between the determined signature and a stored signature at 508. For example, a curve match or curve fitting process is performed to determine if the determined signature of the item being sensed by the sensing device 102 matches any stored signatures. If no match is determined at 508, then access is denied at 510. For example, physical or electronic access is denied to the person. If a match is determined at 508, then access is allowed. For example, physical or electronic access is allowed by the person, having been authenticated by the method 500.

It should be noted that the sensing system 100 can comprise one or more microprocessors (which may be embodied as a processor) and a memory, coupled via a system bus. The microprocessor can be provided by a general purpose microprocessor or by a specialized microprocessor (e.g., an ASIC). In one embodiment, the system can comprise a single microprocessor which can be referred to as a central processing unit (CPU). In another embodiment, the system 100 can comprise two or more microprocessors, for example, a CPU providing some or most of the scanning functionality and a specialized microprocessor performing some specific functionality, such as to determine distance information and correlate that information with the acquired image information. A skilled artisan would appreciate the fact that other schemes of processing tasks distribution among two or more microprocessors are within the scope of this disclosure. The memory can comprise one or more types of memory, including but not limited to: random-access-memory (RAM), non-volatile RAM (NVRAM), etc.

It should be noted that, for example, the various embodiments can communicate between components using different standards and protocols. For example, the wireless communication can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/IxEV-DO protocol family.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The corresponding structures, materials, acts, and equivalents of any means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments in the form disclosed. Many modifications and variations will be apparent to those of ordinary skill in the art without departing from the scope and spirit of embodiments of the disclosure. The embodiments were chosen and described in order to best explain the principles of embodiments and practical application, and to enable others of ordinary skill in the art to understand embodiments with various modifications as are suited to the particular use contemplated.

The foregoing descriptions of specific embodiments have been presented for purposes of illustration and description. They are not intended to be exhaustive or to limit the embodiments to the precise forms disclosed, and obviously many modifications and variations are possible in light of the above teaching. The embodiments were chosen and described in order to best explain principles and practical applications thereof, and to thereby enable others skilled in the art to best utilize the various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims. The following claims are in no way intended to limit the scope of embodiments to the specific embodiments described herein.

What is claimed is:

1. A method for providing access control for users, the method comprising:

- measuring, by a sensor pad in a device including an antenna, electrical characteristics of an item worn by the user, wherein the electric characteristics of the item result from electrical coupling of the user and the item when the item is positioned in proximity to the sensor pad;
- defining a unique electrical signature for the user based on the electrical characteristics of the item worn by the user;
- storing the unique electrical signature in a memory among a plurality of electrical signatures associated with other users;
- comparing, by a processor, an acquired electrical signal with the unique electrical signature;
- identifying a user in response to determining the acquired electrical signal matches the unique electrical signature; and
- allowing access to a restricted area in response to determining whether the user is allowed to access to the restricted area.

2. The method of claim 1, wherein the comparing comprises performing, with the processor, a curve match process to determine if one or more curves corresponding to the unique electrical signature match with one or more curves corresponding to the plurality of stored electrical signatures stored in the memory.

3. The method of claim 1, further comprising configuring the device to include the antenna used to determine a self-inductance of the item coupled with the person.

4. The method of claim 1, wherein the determining comprises measuring parasitic inductances and capacitances of the item using a frequency below a self-resonance of the item.

5. The method of claim 1, wherein the determining comprises measuring a complex radar cross section (RCS) of the item using a frequency above a self-resonance of the item.

6. The method of claim 1, wherein the restricted area comprises one of:

a physical area that is accessible by a door; and an electrical area storing electrical data or software.

7. The method of claim 1, further comprising receiving a request to enter the restricted area from the user.

8. The method of claim 1, further comprising identifying the user based on the match and predetermined position information of the item, including predefined orientation information.

9. A system comprising:

a sensor pad in a device including an antenna, the device configured to measure electrical characteristics of an item worn by the user, wherein the electric characteristics of the item result from electrical coupling of the user and the item when the item is positioned in proximity to the sensor pad, wherein a unique electrical signature for the user is pre-defined based on the electrical characteristics;

a controller operable on a processor to authenticate the user wearing the item using the electrical characteristics of the item in response to matching the unique electrical signature with electrical signatures pre-stored in a database.

10. The system of claim 9, wherein the item is non-modified jewelry having no active or passive electronic devices coupled therewith and the electrical characteristics of the jewelry are based only on the physical properties of the non-modified jewelry.

11. The system of claim 9, wherein the controller is operable on the processor to authenticate the person to allow access to a restricted physical or electronic location.

12. The system of claim 9, further comprising a memory storing a plurality of electrical signatures corresponding to measured electrical characteristics for a plurality of items, and wherein the controller is operable on the processor to determine if an electrical signature determined from electrical characteristics of the item coupled with the person match one of the plurality of electrical signatures stored in the memory to authenticate the person wearing the item.

13. The system of claim 9, further comprising a memory storing a plurality of inductance and capacitance curves for a plurality of items, and wherein the electrical signatures comprise inductance and capacitance signatures determined from parasitic inductances and capacitances between the item and the antenna and the controller is operable on the processor to authenticate the person based on a comparison of measured inductance and capacitance signatures to the a plurality of inductance and capacitance curves stored in the memory.

14. The system of claim 9, wherein the item is nonmodified jewelry has no electronic devices coupled therewith and the electrical characteristics of the jewelry are based only on measured electrical properties of the nonmodified jewelry.

15. A system comprising:

a device comprising a sensor pad and an antenna configured to measure electrical characteristics of an item worn by the user, wherein the electric characteristics of the item result from electrical coupling of the user and the item when the item is positioned in proximity to the sensor pad;

a processor configured to define a unique electrical signature for the user based on the electrical characteristics; and a memory configured to store a plurality of unique electrical signatures for a plurality of users, each of the plurality of unique electrical signatures being measured electrical characteristics for respective plurality of items coupled to each respective user.

16. The system of claim 15, further comprising a controller operable on a processor to determine if an electrical signature determined from the electrical characteristics of the item coupled with the person match one of the plurality of electrical signatures stored in the memory to authenticate the person having the item coupled thereto.

17. The system of claim 15, wherein the device comprises the antenna within a metal plate configured to measure the electrical characteristics of an item coupled with the person.

18. The system of claim 17, wherein the controller is operable on the processor to determine a self-inductance of the item based on parasitic inductances and capacitances between the item and the antenna.

19. The system of claim 17, wherein the device comprise a dielectric cover on top of the antenna to define a sensing distance between the item and the antenna.

20. The system of claim 15, wherein the device comprises a radar configured to identify the item coupled with the person, the controller being operable on the processor to determine a complex radar cross section (RCS) signature of the item based on reflected radar signals from the item.

21. The system of claim 15, wherein the item is jewelry and the controller is operable on the processor to determine a self-inductance of the jewelry based on a measured inductance or capacitance using a frequency below a self-resonance of the jewelry.

22. The system of claim 15, further comprising a radar within the device, wherein the item is jewelry and the controller is operable on the processor to determine a complex radar cross section (RCS) signature of the item based on reflected radar signals from the jewelry using a frequency above a self-resonance of the jewelry.

23. The system of claim 15, wherein a controller is operable on the processor to authenticate the person to allow access to a restricted physical or electronic location based on the electrical characteristics of the item coupled with the person and a time period during which the item is within a sensing distance of the device.

24. The system of claim 15, wherein the item is non-modified jewelry having no active or passive electronic devices coupled therewith.

* * * * *